United States Patent
Bogineni et al.

(10) Patent No.: US 10,264,413 B1
(45) Date of Patent: Apr. 16, 2019

(54) INTEGRATED RICH COMMUNICATIONS SERVICES (RCS) MESSAGING

(71) Applicant: Verizon Patent and Licensing Inc., Arlington, VA (US)

(72) Inventors: Kalyani Bogineni, Hillsborough, NJ (US); Sudhakar Reddy Patil, Flower Mound, TX (US); Paula C. Scharlach, Basking Ridge, NJ (US); Bjorn Hjelm, Livermore, CA (US); Gordana Guranovic, Basking Ridge, NJ (US); Jyotsna Kachroo, Millburn, NJ (US); Hesham Elbatouti, Madison, NJ (US); Yousef Abdelmalek, New Providence, NJ (US); Andrew Wahlon Lam, River Edge, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 15/968,527

(22) Filed: May 1, 2018

(51) Int. Cl.
*H04W 4/12* (2009.01)
*H04W 8/24* (2009.01)

(52) U.S. Cl.
CPC ........... *H04W 4/12* (2013.01); *H04W 8/24* (2013.01)

(58) Field of Classification Search
CPC .......... H04W 60/00; H04W 4/12; H04L 69/08
See application file for complete search history.

(56) References Cited

U.S. PATENT DOCUMENTS

| | | | |
|---|---|---|---|
| 2013/0198382 A1* | 8/2013 | Wang | H04L 65/1069 709/225 |
| 2014/0134978 A1* | 5/2014 | Zitnik | H04L 69/08 455/411 |
| 2016/0285915 A1* | 9/2016 | Lidin | H04W 8/24 |
| 2018/0227871 A1* | 8/2018 | Singh | H04W 60/00 |

OTHER PUBLICATIONS

GSM Association, "Service Provider Device Configuration Version 5.0" https://www.gsma.com/newsroom/wp-content/uploads//RCC.14_v5.0.pdf, Jun. 28, 2017, 77 pages.
(Continued)

*Primary Examiner* — Myron Wyche

(57) ABSTRACT

A device can determine that a sender user equipment connected to a network has been authenticated. The device can cause another device associated with the network to provide configuration information to the sender user equipment after determining that the sender user equipment has been authenticated. The device can receive an RCS message from the sender user equipment after causing the other device to provide the configuration information. The device can determine a capability of a set of receiver user equipment utilizing capability information stored in a data structure. The device can selectively provide the RCS message to the set of receiver user equipment utilizing the non-IMS RCS messaging based on the capability of the set of receiver user equipment, or provide the RCS message to the set of receiver user equipment without utilizing the non-IMS RCS messaging based on the capability of the set of receiver user equipment.

20 Claims, 12 Drawing Sheets

(56) References Cited

OTHER PUBLICATIONS

3GPP, 3rd Generation Partnership Project; Technical Specification Group Services and System Aspects; System Architecture for the 5G System; Stage 2 (Release 15), https://portal.3gpp.org/desktopmodules/Specifications/SpecificationDetails.aspx?specificationId=3144, Mar. 28, 2018, 201 pages.
Tech-Invite, "Procedures for the 5G System", http://www.tech-invite.com/3m23/tinv-3gpp-23-502.html, Mar. 2018, 3 pages.
GSM Association, "Rich Communication Suite RCS API Detailed Requirements" https://www.gsma.com/futurenetwork/wp-content/uploads/2017/10/RCC.13_v3.0.pdf, Oct. 19, 2017, 92 pages.

\* cited by examiner

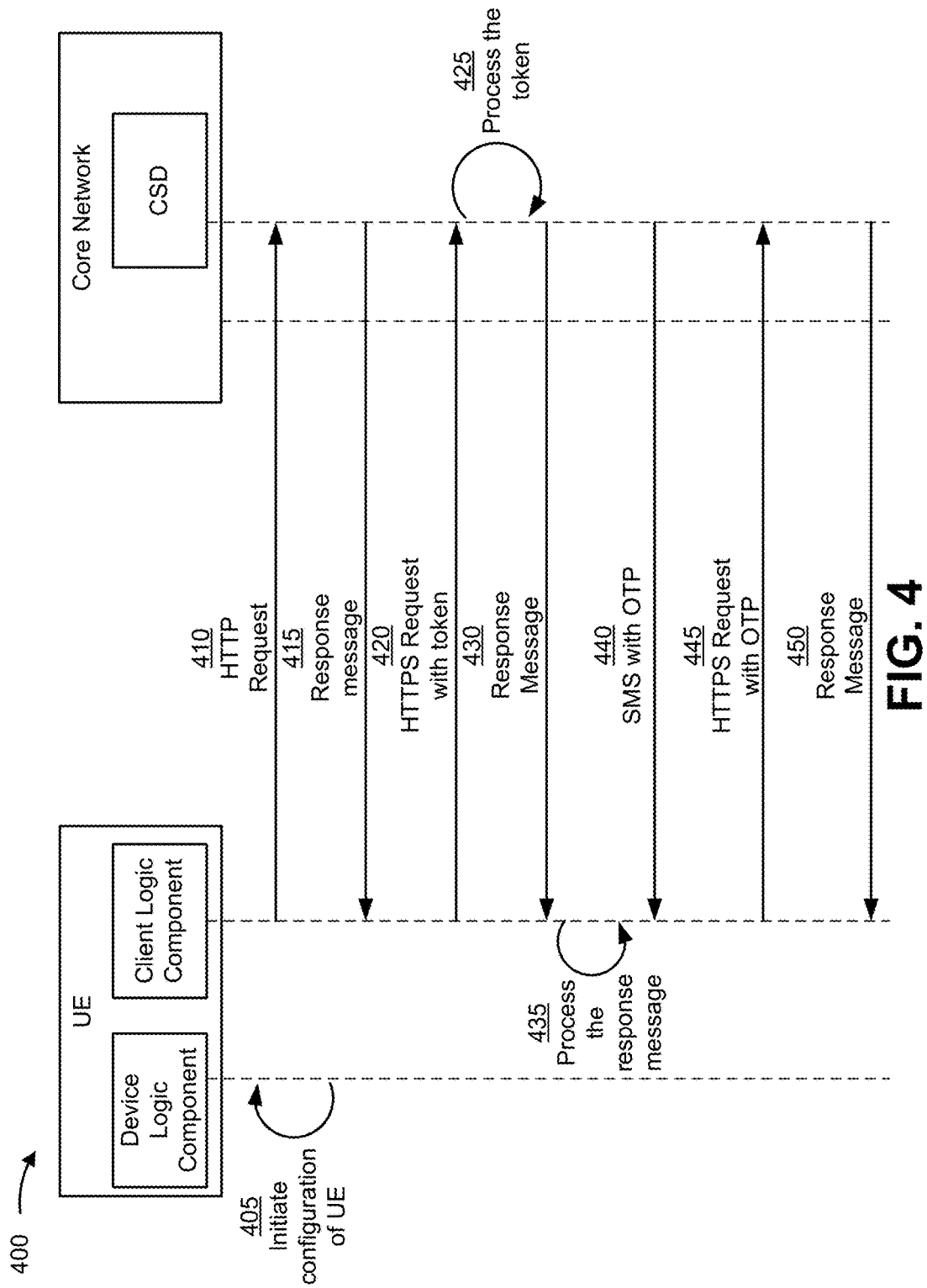

INTEGRATED RICH COMMUNICATIONS SERVICES (RCS) MESSAGING

BACKGROUND

Rich communication services (RCS) is a communication protocol between mobile telephone carriers. RCS provides a text-message system similar to short message service (SMS) messages. However, RCS is capable of providing services that SMS cannot provide, such as phonebook polling for service discovery, transmitting in-call multimedia, and/or the like.

BRIEF DESCRIPTION OF THE DRAWINGS

FIG. 4 is a call flow diagram of an example call flow for configuring the user equipment.

DETAILED DESCRIPTION OF PREFERRED EMBODIMENTS

The following detailed description of example implementations refers to the accompanying drawings. The same reference numbers in different drawings can identify the same or similar elements.

A network can be configured to utilize rich communications services (RCS) messaging. Currently, to implement RCS messaging, the network needs to utilize an Internet protocol (IP) multimedia subsystem (IMS) core and/or session initiation protocol (SIP) (e.g., referred to herein as "IMS-based RCS messaging"). As the quantity of user equipment connected to the network increases, utilizing IMS-based RCS messaging and/or other IMS-based RCS services can introduce significant delays into RCS messaging, such as delays in session initiation. Similarly, utilizing IMS-based RCS messaging can consume significant processing resources of the network via additional authentication steps associated with utilizing the IMS core.

Some implementations described herein provide a device, within a network, that is capable of selectively utilizing an IMS core and/or SIP in conjunction with RCS messaging and/or other RCS-based services based on a capability of a user equipment to which an RCS message is destined (e.g., selectively utilizing IMS-based RCS messaging or non-IMS RCS messaging). For example, the device can utilize application programming interfaces (APIs) and/or hypertext transfer protocol (HTTP) communications to implement RCS messaging between user equipment (UE) that are capable of utilizing non-IMS RCS messaging (e.g., RCS messaging that does not include utilizing an IMS core). In this way, the device facilitates simpler and/or more streamlined RCS messaging within a network and/or between networks. This reduces or eliminates delays introduced via utilization of the IMS core network and/or SIP for IMS-based RCS messaging, thereby improving RCS messaging. In addition, this reduces or eliminates a need to utilize the IMS core and/or SIP by default for RCS messaging via use of non-IMS RCS messaging, thereby conserving processing resources associated with utilizing the IMS core and/or SIP for RCS messaging. Further, this increases a scalability of a network, so that the network can support an increased quantity of UEs, can support increased signaling from UEs connected to the network, and/or the like. Further, this conserves processing resources that would otherwise be consumed due to additional authentication performed by an IMS core during IMS-based RCS messaging by reducing or eliminating a need to utilize the IMS core for RCS messaging.

Figure 1:
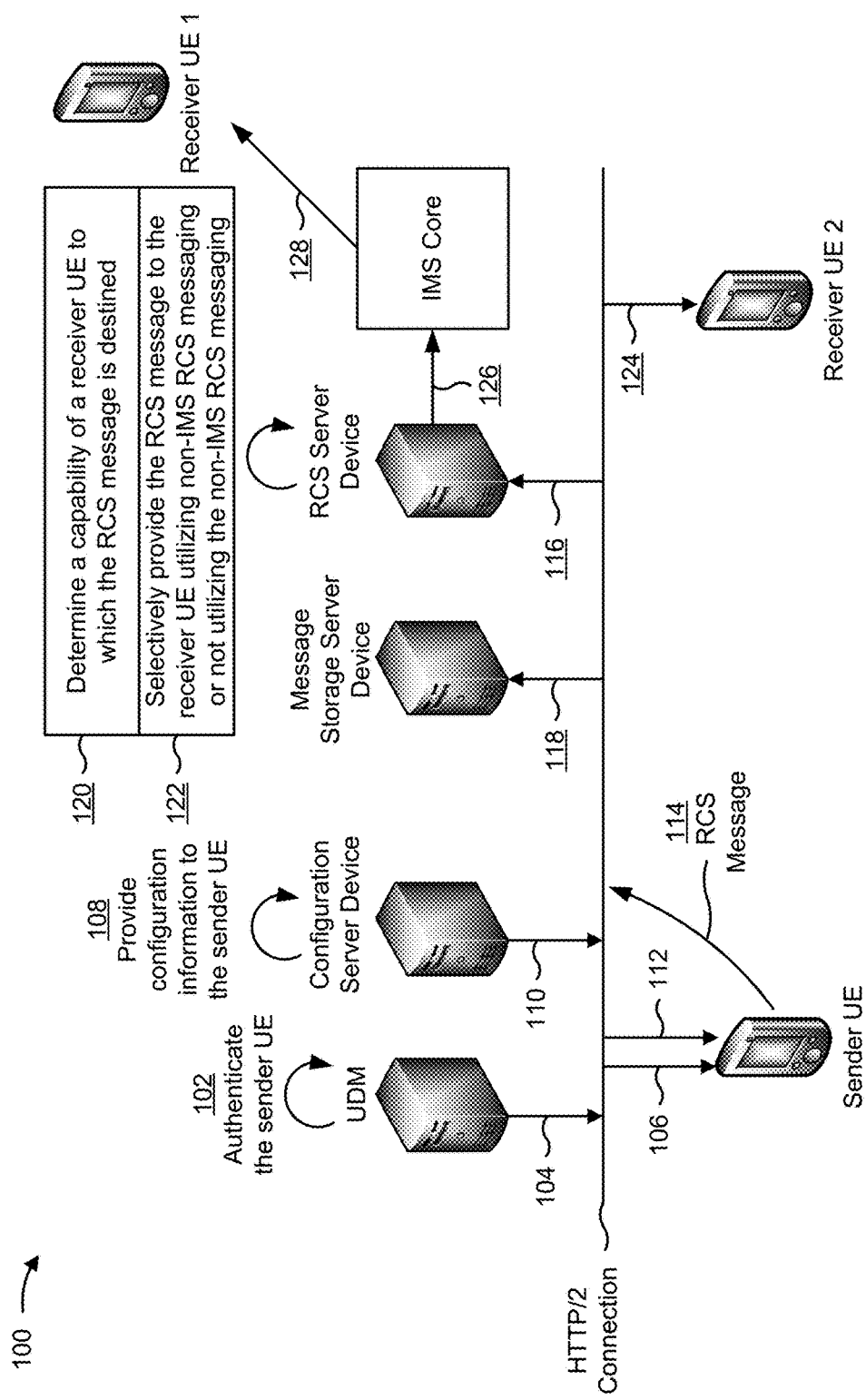
FIG. 1 is a diagram of an example implementation described herein.

FIG. 1 is a diagram of an example implementation 100 described herein. FIG. 1 shows a 5G/new radio (NR) network with native RCS connectivity and connectivity to an IMS core through an interworking function (which is described in more detail elsewhere herein). For example, the architecture shown in FIG. 1 can support both IMS-based RCS messaging and non-IMS RCS messaging (or other IMS-based RCS services and non-IMS RCS services), as described in more detail herein. As shown in FIG. 1, implementation 100 can include a sender UE, a unified data management (UDM) component, a configuration server device (CSD), a message storage server device (MSSD), an RCS server device (RCS SD), the IMS core, and multiple receiver UEs (e.g., shown as "receiver UE 1" and "receiver UE 2"). As further shown, some elements (e.g., devices, components, and/or functional elements) of implementation 100 can be connected via an HTTP connection (e.g., an HTTP/2 connection, an HTTP secure (HTTPS) connection, and/or the like). Although implementation 100 shows separate elements, some of the elements can be combined into a single element. For example, the UDM component, the RCS SD, and the CSD can be implemented as a single element. For FIG. 1, assume that receiver UE 1 is not capable of receiving non-IMS RCS messaging messages (e.g., based on not being configured to communicate utilizing non-IMS RCS messaging, based on being connected to a network that only supports IMS-based RCS messaging, based on being connected to a network that does not support RCS messaging, and/or the like).

In some implementations, when the sender UE connects to a network (e.g., a 5G/NR network), the sender UE can communicate with the UDM component to authenticate the UE for service initiation (e.g., by requesting authentication from the network, by receiving an instruction from the network to provide information that can be used to authenticate the sender UE, and/or the like). As shown by reference number 102, the UDM component can authenticate the sender UE. For example, the UDM component can authenticate authentication information from the sender UE, such as a set of credentials from the sender UE, a service and/or application-specific token from the sender UE, and/or the like (e.g., by performing a lookup of the authentication information in a data structure and determining whether the lookup indicates a match, for RCS services). As shown by reference numbers 104 and 106, the UDM component can provide, to the sender UE, information that indicates that the sender UE has been authenticated, can permit the sender UE to connect to the network, can establish a connection to the network for the sender UE, and/or the like for services authorized by a network operator.

As shown by reference number 108, after the UDM component has authenticated the sender UE, the CSD can provide RCS provisioning configuration information to the sender UE. For example, the configuration information can identify one or more configurations of the network, such as whether the network supports one-to-one RCS-based chat, whether the network supports RCS-based group chat, a maximum quantity of recipients permitted for RCS-based group chat, whether the network supports RCS-based file transfer, a maximum file size for a file transfer (e.g., a per file limit, a per time period limit, and/or the like), whether the network supports RCS-based IP voice calls, whether the network supports RCS-based audio messaging, whether the network supports RCS-based video messaging, and/or the like. In some implementations, the configuration information can be in the form of an extensible markup language (XML) file, a comma-separated values (CSV) file, a text file, in JavaScript object notation (JSON) format, and/or the like.

In some implementations, the CSD can provide the configuration information to the sender UE based on detecting authentication of the sender UE and/or determining that the sender UE has been authenticated (e.g., the CSD can be subscribed to authentication-related messages from the UDM component such that the CSD receives a copy of the authentication-related messages from the UDM component and can accordingly determine that the sender UE has been authenticated via these messages). Additionally, in some implementations, the CSD can receive a request from the sender UE for the configuration information (e.g., after the sender UE has been authenticated) and can provide the configuration information to the sender UE based on receiving the request. Additionally, or alternatively, the CSD can receive a set of instructions from another authorized device to provide the configuration information. For example, the RCS SD, rather than the CSD, can be subscribed to authentication-related messages from the UDM component and can cause the CSD to provide the configuration information based on the UDM component authenticating the sender UE. As shown by reference numbers 110 and 112, the CSD can provide the configuration information to the sender UE via the HTTP/2 connection. Although an HTTP/2 connection is shown in FIG. 1, other types of connections are possible, such as an HTTP connection, an HTTPS connection, and/or the like.

As shown by reference number 114, the sender UE can send an RCS message via the HTTP/2 connection. Although reference number 114 shows an RCS message being sent from the sender UE to a receiver UE, the implementations apply equally to scenarios where the sender UE is receiving an RCS message. Similarly, UEs that are described as receiving an RCS message from the sender UE could, in other scenarios, send an RCS message. In some implementations, an RCS message can include a message (e.g., a text message, a Binary text message, a multimedia message, and/or the like), a file transfer, a voice call, a video call, and/or the like based on RCS messaging protocols. As a specific example, an RCS-based text messaging application can be installed on the sender UE. In this case, a user of the UE can input text to the application via a user interface associated with the application and can cause the application to send an RCS message via selection of a control (e.g., a button) on the user interface. In some implementations, when sending an RCS message, the sender UE can utilize various APIs between the sender UE (e.g., the RCS-based application) and other elements connected to the HTTP/2 connection. For example, the sender UE can utilize a registration API for registration-related services, a send message API for sending an RCS message, a receive message API for receiving an RCS message, a send read report API for sending a read report for an RCS message, a receive read report for receiving a read report for an RCS message (and/or similar APIs for delivery reports), a broadcast API for a one-to-many RCS message, a file transfer API for sending and/or receiving a file transfer, and/or the like. Additionally, or alternatively, the sender UE (e.g., via the RCS-based application) can utilize representational state transfer (REST) APIs based on HTTP to send an RCS message.

Assume for FIG. 1, that the RCS message is destined for both receiver UE 1 and receiver UE 2 (e.g., the RCS message can be a group message, an RCS message with multiple individual recipients, and/or the like). As shown by reference number 116, the RCS SD can receive the RCS message prior to the RCS message being delivered to the receiver UEs. For example, the RCS SD can receive the RCS message via the HTTP/2 connection, via an API, and/or the like.

As shown by reference number 118, after receiving the RCS message, the RCS SD can cause a copy of the RCS message to be stored in the MSSD. For example, the RCS SD can cause the RCS message to be stored in a data structure that includes information identifying the sender UE, or an account associated with the sender UE, information identifying the RCS message, the content of the RCS message, metadata related to the RCS message (e.g., a date and/or time of the RCS message, a recipient of the RCS message, a size of the RCS message (e.g., a quantity of bytes of the RCS message), and/or the like. This facilitates recovery of the RCS message by the sender UE (e.g., after deletion of the RCS message from memory resources of the sender UE), metrics tracking for charging and/or billing of an account associated with the sender UE, network analytics (e.g., network performance analytics, user-specific analytics, and/or the like), loading of a set of RCS messages associated with an account onto a new sender UE (e.g., upon replacement of the sender UE), and/or the like.

As shown by reference number 120, the RCS SD can determine a capability of a receiver UE to which the RCS message is destined (e.g., can determine a respective capability of receiver UE 1 and receiver UE 2). For example, a capability can include whether a receiver UE is capable of communicating utilizing non-IMS RCS messaging and/or IMS-based RCS messaging (e.g., based on being configured to communicate utilizing non-IMS RCS messaging and/or IMS-based messaging, based on being connected to a network that supports non-IMS RCS messaging and/or IMS-based RCS messaging, and/or the like). In some implementations, the RCS message can include information identifying a receiver UE to which the RCS message is destined (e.g., in a header of the message, in a recipient filed of the message, in metadata associated with the RCS message, and/or the like). In some implementations, the RCS SD can process the RCS message to identify the information identifying the receiver UE to which the RCS message is destined. For example, the RCS SD can process the RCS message to identify receiver UE 1 and receiver UE 2 as the intended destinations for the RCS message.

In some implementations, the RCS SD can perform a lookup of the information identifying the receiver UE in a data structure to determine whether the receiver UE is connected to the network with which the RCS SD is associated. For example, the RCS SD can maintain a data structure that includes information identifying the UEs connected to the network and respective capability information related to the UEs (e.g., capability information, associated with a capability discovery, identifying whether the UEs are capable of communicating utilizing non-IMS RCS messaging, IMS-based RCS messaging, and/or the like). In some implementations, based on the lookup indicating a match, the RCS SD can identify corresponding capability information in the data structure that identifies whether a receiver UE is capable of communicating utilizing non-IMS RCS messaging, utilizing IMS-based RCS messaging, and/or the like. For example, if both receiver UE 1 and receiver UE 2 are connected to the network with which the RCS SD is associated, then the RCS SD can be capable of performing a lookup of respective capability information for both receiver UE 1 and receiver UE 2. Continuing with the previous example, and in this case, a result of the lookup can indicate that receiver UE 1 is only capable of communicating utilizing IMS-based RCS messaging or is not capable of communicating utilizing non-IMS RCS messaging and/or that receiver UE 2 is capable of communicating utilizing non-IMS RCS messaging.

In some implementations, if the lookup does not return a match the RCS SD can assume that a receiver UE to which the RCS message is destined is not capable of communicating utilizing the non-IMS RCS messaging. For example, when a receiver UE is not connected to the network with which the RCS SD is associated, the lookup can fail to return a match and the RCS SD can assume that the receiver UE is not capable of communicating utilizing the RCS messaging. Continuing with the previous example, if receiver UE 1 were connected to a different network than the RCS SD, the lookup can fail to return capability information for receiver UE 1.

In some implementations, if a receiver UE is connected to a different network than the RCS SD, the RCS SD can perform a lookup of information identifying the different network to determine whether the different network supports non-IMS RCS messaging. For example, the information identifying the different network can be included in metadata, a header, and/or the like associated with the RCS message, and the RCS SD can perform a lookup for corresponding capability information for the network in a data structure. In this way, the RCS SD can determine a capability of a receiver UE to which an RCS message is destined. In some implementations, rather than performing a lookup, the RCS SD can query a receiver UE to determine a capability, via a capability discovery, of the receiver UE. For example, the RCS SD can send a set of instructions and/or a request to the receiver UE for the receiver UE to provide capability information to the RCS SD. In some implementations, this technique can be utilized for UEs connected to networks different than the RCS SD.

As shown by reference number 122, the RCS SD can selectively provide the RCS message to the receiver UE utilizing non-IMS RCS messaging or not utilizing the non-IMS RCS messaging. In some implementations, the RCS SD can provide the RCS message utilizing non-IMS RCS messaging based on a receiver UE being configured to communicate utilizing non-IMS RCS messaging (e.g., as determined from capability information for the receiver UE). As shown by reference number 124, and assuming that receiver UE 2 is capable of communicating utilizing non-IMS RCS messaging, the RCS SD can provide the RCS message to receiver UE 2 based on determining that receiver UE 2 is capable of communicating utilizing non-IMS RCS messaging. For example, the RCS SD can provide the RCS message to receiver UE 2 via the HTTP/2 connection, via an API, as an HTTP-based message, via one or more other elements not shown (e.g., a base station, a (radio) access network ((R) AN), and/or the like).

In this way, the RCS SD can provide the RCS message without utilizing the IMS core. This conserves processing resources that would be consumed utilizing the IMS core to send an RCS message. Further, this reduces or eliminates delay that would otherwise be consumed utilizing the IMS core to send an RCS message.

In some implementations, the RCS SD can provide the RCS message without utilizing non-IMS RCS messaging and/or by utilizing IMS-based RCS messaging based on determining that a receiver UE to which the RCS message is destined is not capable of communicating utilizing non-IMS RCS messaging. Additionally, or alternatively, the RCS SD can provide the RCS message without utilizing non-IMS RCS messaging and/or by utilizing IMS-based RCS messaging based on determining that a receiver UE to which the RCS message is destined is connected to a different network than the RCS SD and/or is connected to a network that does not support non-IMS RCS messaging (e.g., as determined with regard to reference number 120). As shown by reference numbers 126 and 128, and assuming that receiver UE 1 is not capable of communicating utilizing non-IMS RCS messaging (e.g., is not configured to communicate utilizing non-IMS RCS messaging, is connected to a network that does not support non-IMS RCS messaging, and/or the like), the RCS SD can provide the RCS message to receiver UE 1 utilizing the IMS core. In some implementations, the RCS message can be provided utilizing one or more other elements not shown in FIG. 1, such as a base station, a web real-time communication (webRTC) gateway device (webRTC GD), and/or the like.

In this way, the RCS SD (and the network architecture shown in FIG. 1) can maintain interoperability with UEs and/or networks that do not support non-IMS RCS messaging. This improves deployment of non-IMS RCS messaging, reduces or eliminates errors that would otherwise be caused due to interoperability issues, and/or the like.

In some implementations, the RCS message can need to be converted into another format prior to providing the RCS message to a receiver UE (e.g., receiver UE 1), such as when the receiver UE is not capable of communicating utilizing non-IMS RCS messaging. For example, the RCS message can need to be converted from a format associated with an API used for non-IMS RCS messaging to a SIP format, from an HTTP format to a SIP format, and/or the like. In some implementations, the RCS SD can convert the RCS message into another format. In some implementations, an internetworking function (IF) (not shown) can convert the RCS message into another format based on being configured to convert an RCS message from one format to the other format. For example, the IF can be implemented on the RCS SD, or can be a separate element. In some implementations, there may be multiple RCS SDs. For example, a first RCS SD (e.g., RCS SD1 described with regard to FIGS. 2A-2B) may include an RCS API gateway device and an RCS application server and a second RCS SD (e.g., RCS SD2 described with regard to FIGS. 2A-2B) may include an RCS application server. In this case, the IF may be connected to RCS SD1 to provide interoperability functions, as described elsewhere herein.

In this way, a network can be configured with an RCS SD that is capable of selectively utilizing non-IMS RCS messaging or IMS-based RCS messaging. This increases adaptability of the network to facilitate both non-IMS RCS messaging and IMS-based RCS messaging. In addition, this facilitates compatibility between different network operators (e.g., between a network operator that has implemented non-IMS RCS messaging and another network operator that has implemented IMS-based RCS messaging). Further, this facilitates integration of RCS messaging with a 5G/NR architecture, such as a reference point architecture and/or a service-based architecture (e.g., utilizing APIs). Further, this facilitates sharing and/or use of UE-related information between a 5G/NR architecture and an RCS messaging-based services (e.g., location information, registration information, and/or the like).

As indicated above, FIG. 1 is provided merely as an example. Other examples are possible and can differ from what was described with regard to FIG. 1. Although FIG. 1 shows an example 5G/NR architecture, the implementations may be applicable, or used with, other types of network architectures, such as a 3G architecture, a 4G architecture, and/or the like. Although implementations described herein are described in connection with RCS messaging, the implementations apply equally to other types of RCS-based services.

Figure 2A:
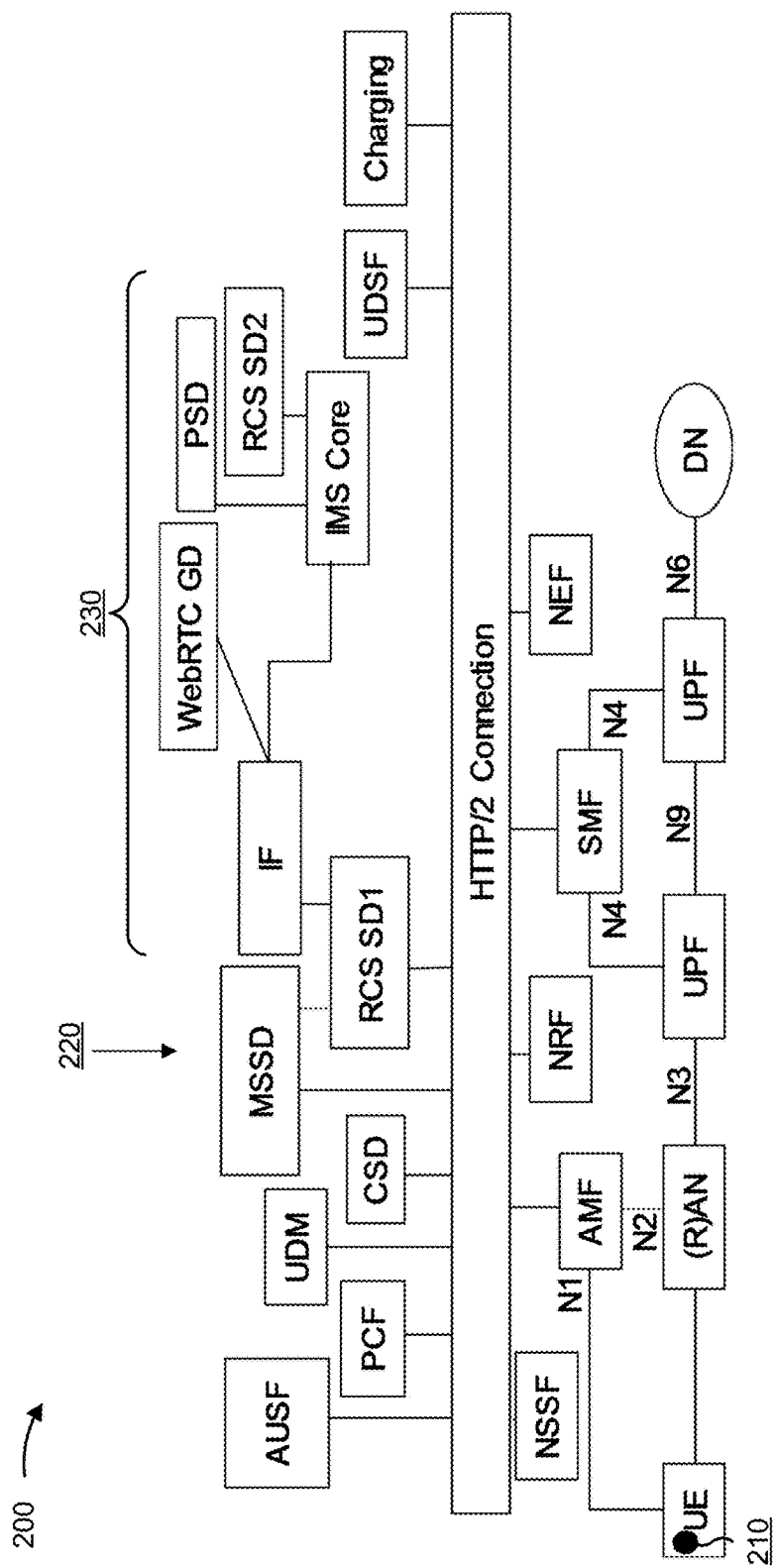
FIGS. 2A-2B are diagrams of example architectures in which example implementations, described herein, can be implemented.
Figure 2B:
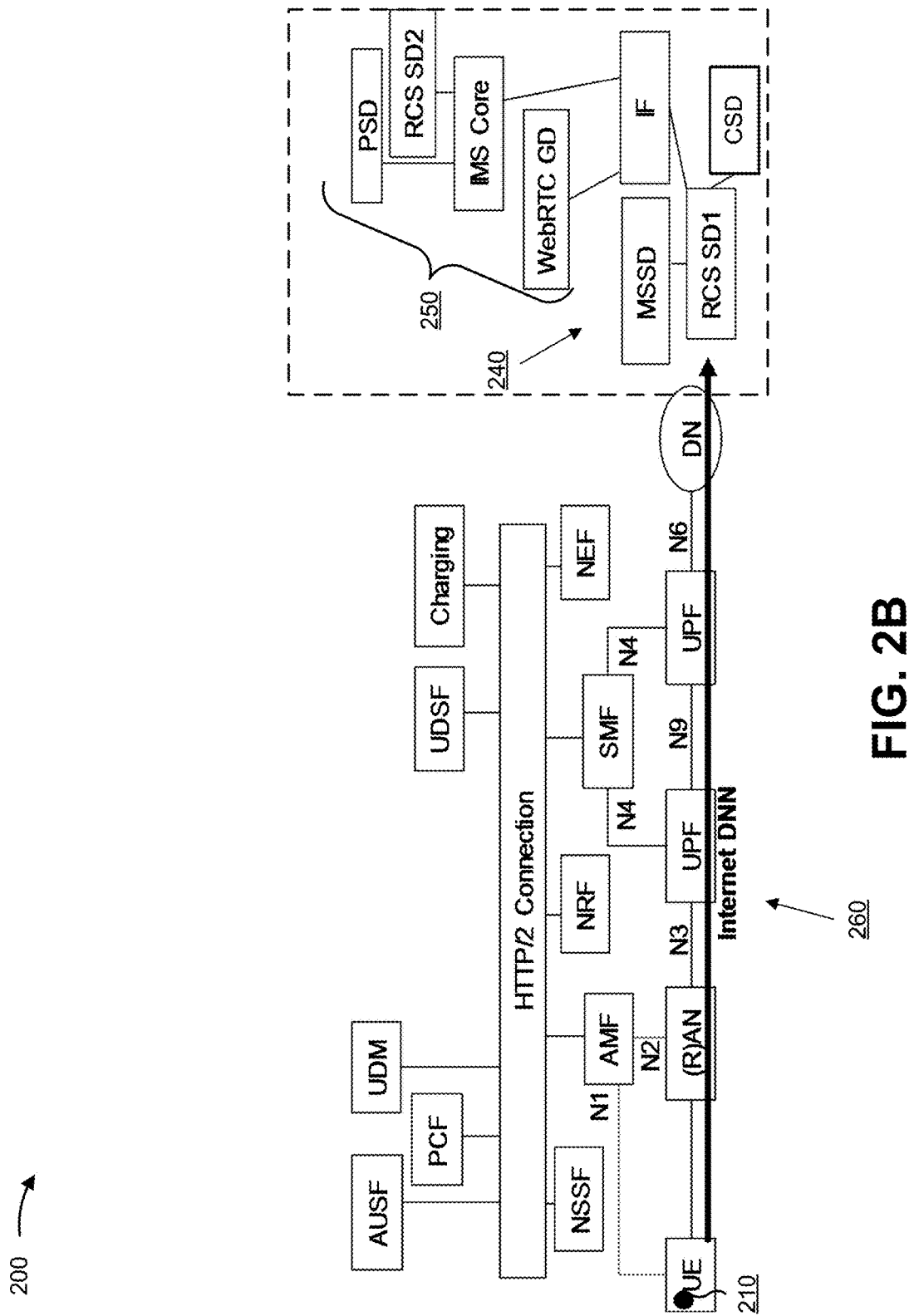

FIGS. 2A-2B are diagrams of example architectures 200 in which example implementations, described herein, can be implemented. As shown in FIGS. 2A-2B, architectures 200 can include various elements, such as an authentication server function (AUSF), a policy control function (PCF), a UDM, a CSD, an MSSD, multiple RCS SDs (e.g., shown as RCS SD1 and RCS SD2), an IF, a webRTC GD, an IMS core, a presence server device (PSD), an unstructured data storage function (UDSF), a charging function (e.g., shown as "charging"), a network slice selection function (NSSF), an access and mobility management function (AMF), a (R)AN, a network repository function (NRF), multiple user plane functions (UPFs), a session management function (SMF), a network exposure function (NEF), a data network, an HTTP/2 connection, and various interfaces (e.g., shown as "N1," "N2," N3," "N4," "N6," and "N9"). Elements of architectures 200 can interconnect via wired connections, wireless connections, or a combination of wired and wireless connections.

FIG. 2A shows a first architecture 200 where RCS-messaging is integrated with a 5G/NR architecture (e.g., is integrated with a control plane of the 5G/NR architecture). As shown in FIG. 2A, and by reference number 210, an application can be installed on the UE. For example, the application can utilize RCS messaging for communications via APIs, HTTP messaging, and/or the like. As a specific example, the application can be an RCS messaging-based client that utilizes representational state transfer (REST) APIs for communications. As shown by reference number 220, the MSSD can be connected to the HTTP/2 connection and/or RCS SD1 so that the MSSD can receive a copy of an RCS message in a manner similar to that described elsewhere herein. The CSD, the MSSD, and RCS SD1 can facilitate use of non-IMS RCS messaging, similar to that described elsewhere herein.

As shown by reference number 230, the IF can be connected to RCS SD1. For example, the IF can convert an RCS message from one format to another format, in a manner similar to that described elsewhere herein. In some implementations, the architectures 200, may include multiple IFs associated with RCS SD1. For example, RCS SD1 may be associated with a first IF to provide interoperability between the HTTP/2 connection and SIP and a second IF to provide interoperability between RCS SD1 and the IMS core. As further shown by reference number 230, the webRTC GD and the IMS core can be connected to the IF. In some implementations, the IMS core can be connected to the HTTP/2 connection via the IF for interoperability between HTTP and SIP, or may be directly connected to RCS SD1. In some implementations, the webRTC GD can provide webRTC-related services via various APIs (e.g., can provide a web browser and/or a mobile application with real-time communications, can provide a connection between webRTC and voice over IP (VoIP) technology, such as SIP, and/or the like). In some implementations, the IMS core can manage device registration, capability discovery, and authentication, session initiation, and/or the like.

As further shown by reference number 230, RCS SD2 and the PSD can be connected to the IMS core. In some implementations, RCS SD2 can be similar to other RCS SDs described elsewhere herein (e.g., can receive an RCS message from a UE and can provide the RCS message to another UE, can provide read and/or delivery reports to a sender UE, and/or the like). In some implementations, the PSD can gather information that identifies UEs connected to a network, a location of the UEs, and/or the like, and can make that information available to other elements in the network, to third parties, and/or the like. In this way, the IF, the webRTC GD, the IMS core, the PSD, and/or the RCS SD2 can facilitate IMS-based RCS messaging in a manner similar to that described elsewhere herein. In this way, the first architecture 200 shown in FIG. 2A facilitates interoperability between non-IMS RCS messaging and IMS-based RCS messaging.

Turning to FIG. 2B, FIG. 2B shows a second architecture 200 where RCS-messaging is provided via an Internet data network name (DNN). As shown by reference number 240 the CSD, the IF, and the MSSD can be connected to RCS SD1. As shown by reference number 250, the webRTC and the IMS core can be connected to the IF, and the PSD and RCS SD2 can be connected to the IMS core. As shown by reference number 260, the second architecture 200 can provide RCS-messaging (e.g., both IMS-based RCS messaging and non-IMS RCS messaging) as an over-the-top service utilizing a user plane connectivity of a UE (e.g., utilizing Internet DNN). In some implementations, Internet DNN can provide connectivity between various data networks (DNs), various cellular networks, various computer networks, and/or the like. In this way, the second architecture 200 provides interoperability between IMS-based RCS messaging and non-IMS RCS messaging, in a manner similar to that described with regard to the first architecture 200 shown in FIG. 2A.

The number and arrangement of elements of the architectures 200 shown in FIGS. 2A-2B are provided as an example. In practice, there can be additional elements, fewer elements, different elements, or differently arranged elements than those shown in FIGS. 2A-2B. Furthermore, two or more elements shown in FIGS. 2A-2B can be implemented within a single element, or a single element shown in FIGS. 2A-2B can be implemented as multiple, distributed elements. Additionally, or alternatively, a set of elements (e.g., one or more elements) of architectures 200 can perform one or more functions described as being performed by another set of elements of architectures 200.

Figure 3:
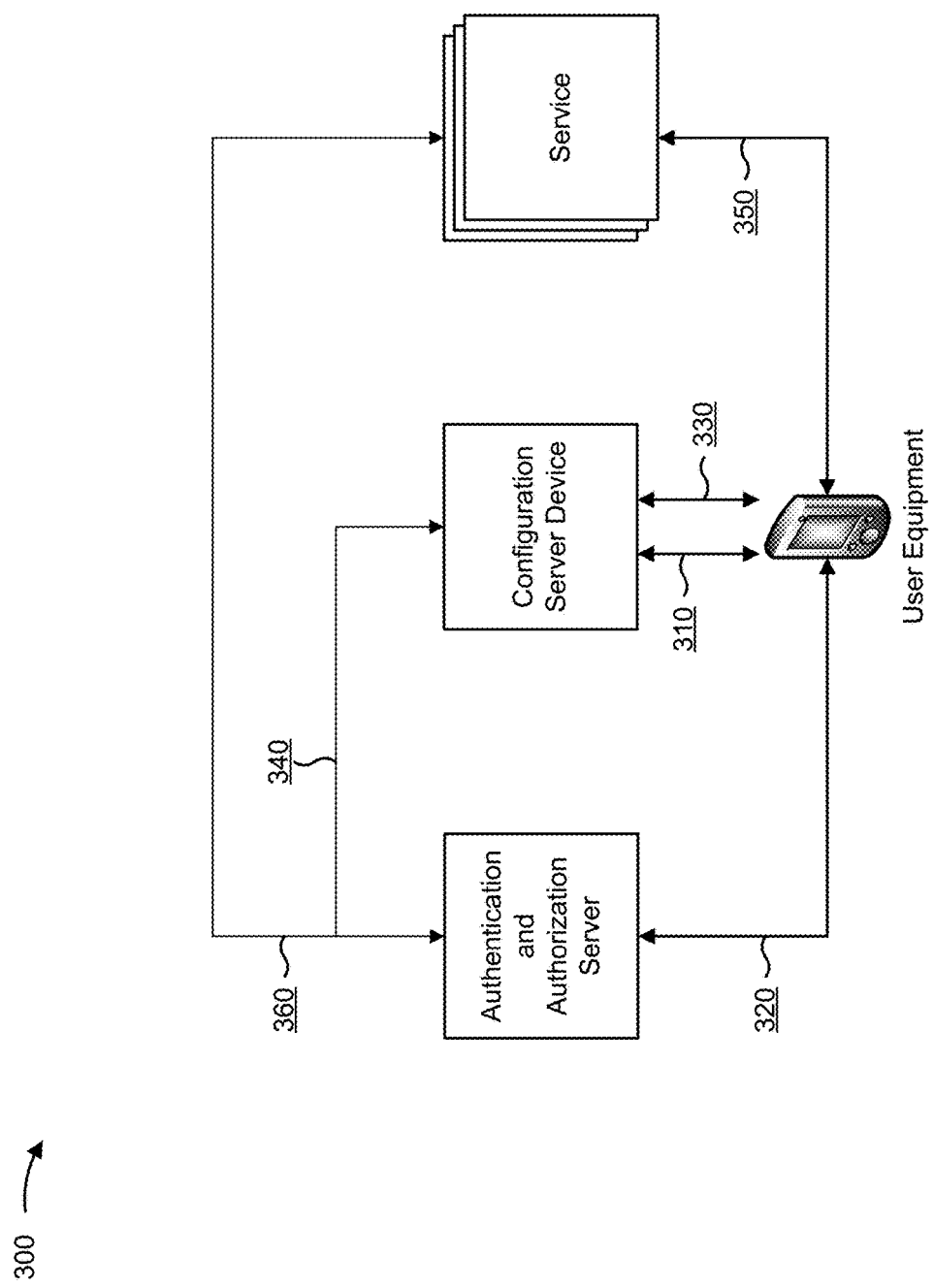
FIG. 3 is a diagram of an example implementation for authenticating a user equipment.

FIG. 3 is a diagram of an example implementation 300 for authenticating a UE. For example, implementation 300 shows the process of authenticating a UE when the UE connects to a network that supports RCS messaging (e.g., non-IMS RCS messaging and/or IMS-based RCS messaging). As shown in FIG. 3, implementation 300 can include an authentication and authorization server (AAS), a configuration server device (CSD), various services (e.g., hosted on a set of server devices), and a UE. As shown by reference number 310, the UE and the CSD can communicate to establish a connection. In some implementations, the CSD can cause an HTTP redirect of the UE to the AAS to initiate an authentication request by the UE to the AAS.

As shown by reference number 320, the UE and the AAS can communicate to authenticate the UE. For example, the UE can provide an OpenID authentication request, a set of credentials, and/or the like to the AAS to facilitate authentication of the UE. In some implementations, based on authentication of the UE, the AAS can generate a token for the UE (e.g., that can be used to authenticate the UE to one or more other devices, to the various services, and/or the like). For example, the AAS can generate an OpenID JavaScript object notation (JSON) web token based on authentication of the UE. In some implementations, the AAS can cause an HTTP redirect of the UE to the CSD, to the various services (or devices via which the various services are provided), and/or the like.

As shown by reference number 330, the UE and the CSD can communicate to provide the token from the AAS to the CSD, so that the CSD can process the token. As shown by reference number 340, the CSD can confirm authenticity of the token by communicating with the AAS. For example, based on processing of the token, the CSD can permit connection of the UE to a network, can provide configuration information to the UE, and/or the like. As shown by reference number 350, to access a service (e.g., a payment processing service, a messaging service, and/or the like) provided by the network, the UE can communicate with the service (e.g., can communicate with a device that hosts the service). In some implementations, the UE can provide the token to the service to facilitate authentication of the UE to the service (e.g., so that the UE can access the service). As shown by reference number 360, the service can communicate with the AAS to confirm the authenticity of the token in a manner similar to that described with regard to reference number 340.

As indicated above, FIG. 3 is provided merely as an example, other examples are possible and can differ from what was described with regard to FIG. 3.

FIG. 4 is a call flow diagram of an example call flow 400 for configuring the UE. For example, call flow 400 shows communication of a UE (e.g., utilizing a device logic component and a client logic component) with a core network (e.g., to a CSD) to cause the CSD to provide configuration information to the UE.

As shown by reference number 405, the device logic component can initiate configuration of the UE. For example, the device logic component can initiate an HTTP request for configuration of the UE. Although some implementations are described with regard to an HTTP request, the implementations apply equally to an HTTPS request, and/or the like. In some implementations, the configuration can be initiated by the UE if the UE detects that the network is capable of providing RCS-based messaging services (e.g., IMS-based messaging services and/or non-IMS RCS messaging services). In some implementations, the configuration can be initiated by the core network if the UE does not detect that the network is capable of providing RCS-messaging services, when one or more configurations of the core network are modified, and/or the like. In some implementations, configuration of the UE can occur over a cellular network, a Wi-Fi network, and/or the like.

As shown by reference number 410, the client logic component can provide an HTTP request for configuration to the CSD (e.g., after being authenticated by the core network). As shown by reference number 415, the CSD can provide a response message to the client logic component. For example, the response message can include an HTTP secure (HTTPS) 511 ok message and a cookie (e.g., that is to cause the UE to utilize a one-time-password (OTP) for configuration). As shown by reference number 420, the client logic component can provide an HTTPS request with a token to the CSD for an OTP. For example, the HTTPS request can include an international mobile subscriber identity (IMSI) for the UE, an international mobile equipment identity (IMEI) for the UE, information that identifies an SMS port for the UE, and/or the like. In some implementations, the token can include the token described with regard to FIG. 3 (e.g., generated by an AAS).

As shown by reference number 425, the CSD can process the token. For example, the CSD can confirm the authenticity of the token. In some implementations, the CSD can further obtain a mobile station international subscriber directory number (MSISDN) associated with an IMSI included in the HTTPS request, can obtain the MSISDN from the HTTP request described with regard to reference number 410, and/or the like (e.g., to confirm authenticity of the token). As shown by reference number 430, the CSD can provide a response message to the client logic component. For example, the response message can include an HTTPS 200 OK message. Additionally, or alternatively, the response message can include a cookie that is similar that that described above, that indicates that the token was authenticated, and/or the like.

As shown by reference number 435, the client logic component can process the response message. For example, the client logic component can determine whether the response message includes the cookie. In some implementations, if the response message does not include the cookie, configuration of the UE can be terminated. As shown by reference number 440, the CSD can provide an SMS message with an OTP to the client logic component for OTP-based configuration. In some implementations, the SMS message can be processed automatically by the UE based on receipt of the SMS message (e.g., the UE can process the OTP included in the SMS message and can submit the OTP to the CSD for configuration). Additionally, or alternatively, the UE can provide the SMS message for display and the user can be prompted to input the OTP into a user interface (e.g., associated with an application, a website, and/or the like). As shown by reference umber 445, the client logic component can provide an HTTPS request with the OTP to the CSD. As shown by reference number 450, the CSD can provide a response message to the client logic component to confirm submission of the OTP. In some implementations, the CSD can provide configuration information to the UE after this process to configure the UE.

As indicated above, FIG. 4 is provided merely as an example. Other examples are possible and can differ from what was described with regard to FIG. 4.

Figure 5A:
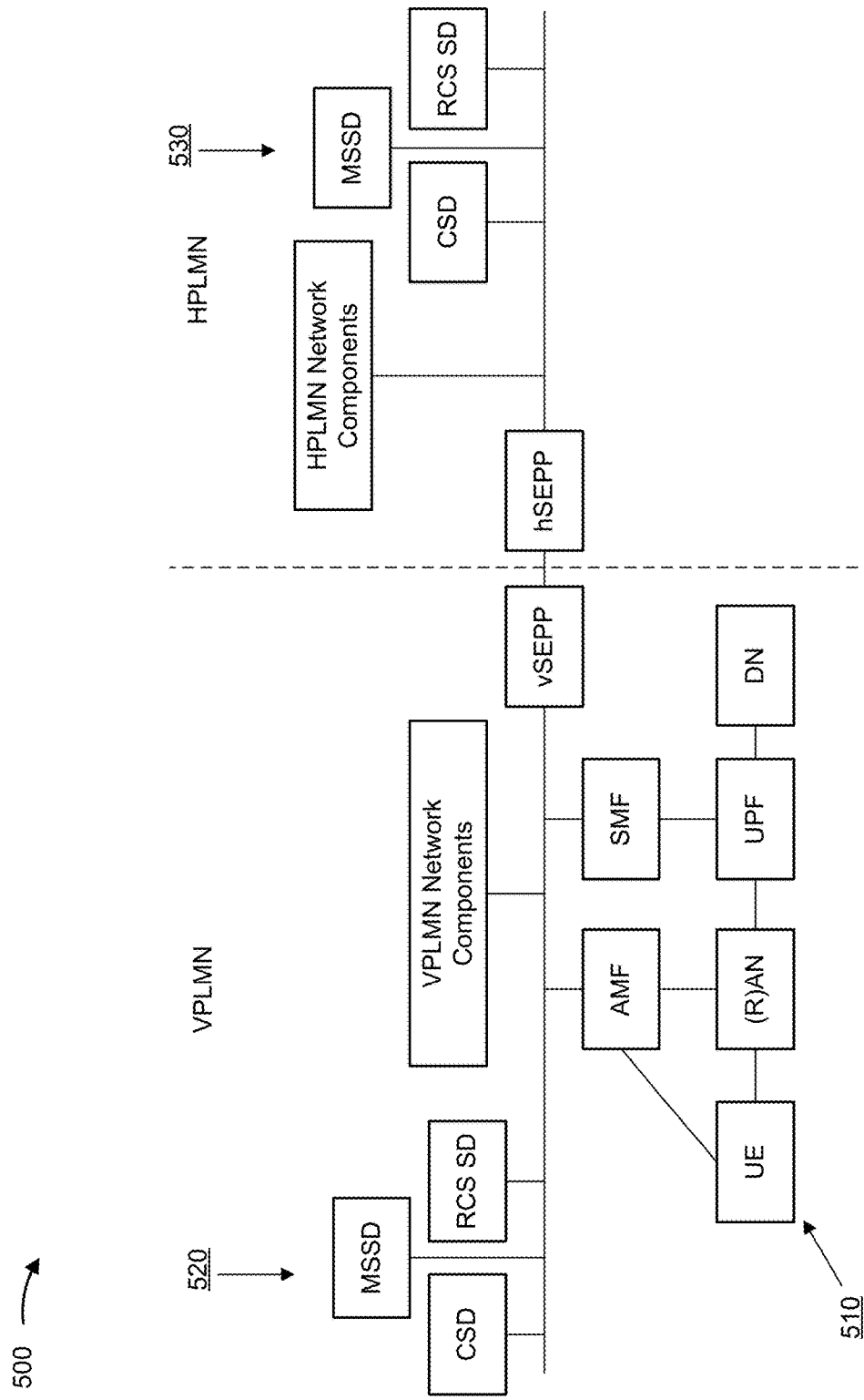
FIGS. 5A-5B are diagrams of example roaming architectures in which example implementations, described herein, can be implemented.
Figure 5B:
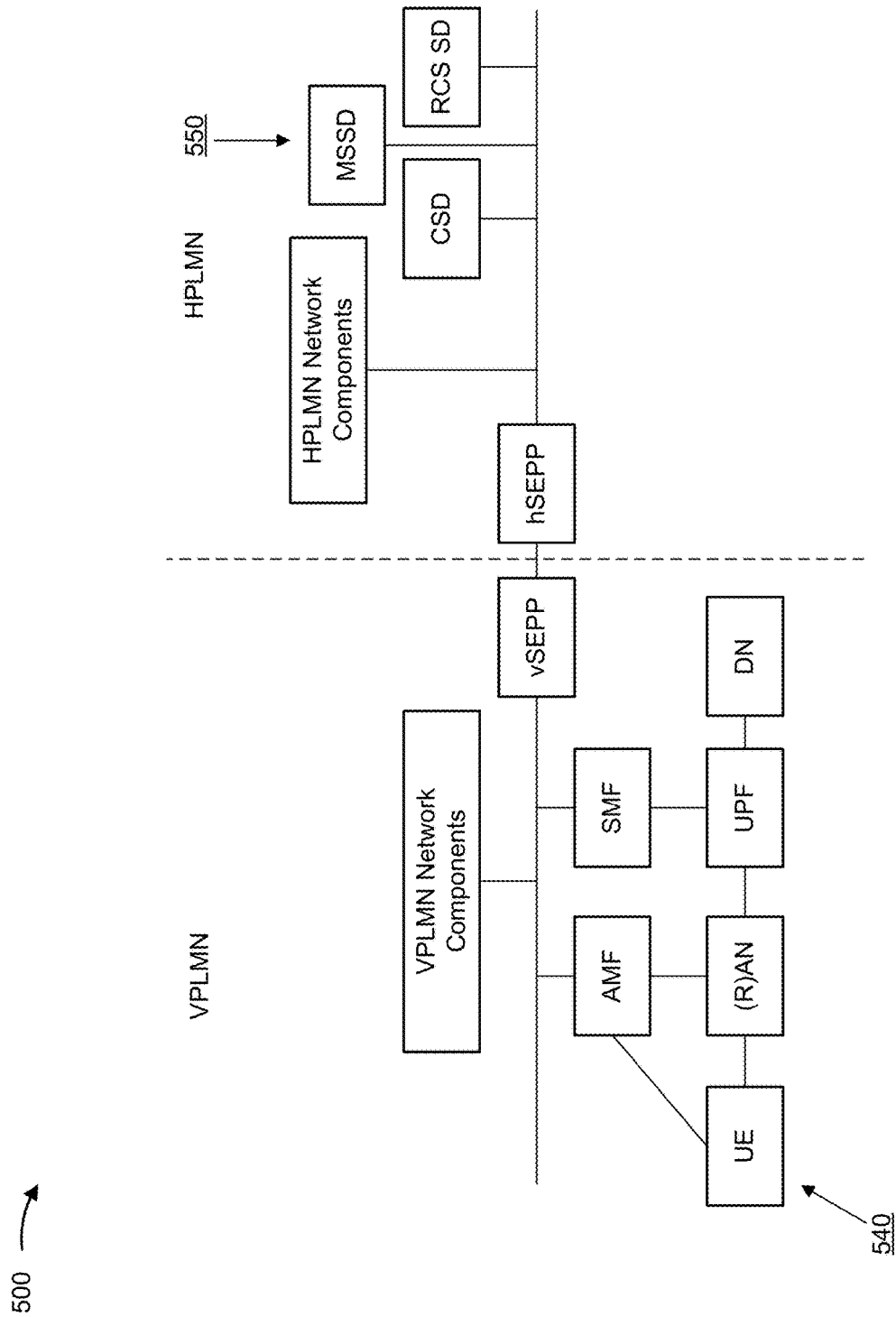

FIGS. 5A-5B are diagrams of example roaming architectures 500 in which example implementations, described herein, can be implemented. FIGS. 5A and 5B show various configurations of a visited public land mobile network (VPLMN) and a home public land mobile network (HPLMN) in which the implementations described herein can be implemented.

FIG. 5A shows a first roaming architecture 500. As shown by reference number 510, a UE can be connected to the VPLMN (e.g., based on roaming from the HPLMN). As shown by reference numbers 520 and 530, both the VPLMN and the HPLMN include elements related to providing non-IMS RCS messaging, similar to that described elsewhere herein. In this case, configuration of the UE, selective providing of an RCS message from the UE, and/or the like can be performed locally by the VPLMN. This reduces or eliminates a need for the UE to communicate with the HPLMN when roaming, thereby conserving network resources between the VPLMN and the HPLMN, reducing latency, and/or the like.

Turning to FIG. 5B, FIG. 5B shows a second roaming architecture 500. As shown by reference number 540, a UE can be connected to the VPLMN, similar to that described with regard to FIG. 5A. As shown by reference number 550, in this configuration, the HPLMN includes elements related to providing non-IMS RCS messaging, similar to that described with regard to FIG. 5A. Contrary to FIG. 5A, the VPLMN does not include the same elements (or the elements are not available to the UE). In this case, the UE would have to communicate with the HPLMN to be configured, for selective providing of an RCS message, and/or the like. In this way, a UE can utilize non-IMS RCS messaging when connected to a VPLMN network that is not configured to provide such services, that does not permit the UE to access such services, and/or the like.

As indicated above, FIGS. 5A-5B are provided merely as an example. Other examples are possible and can differ from what was described with regard to FIGS. 5A-5B.

Figure 6:
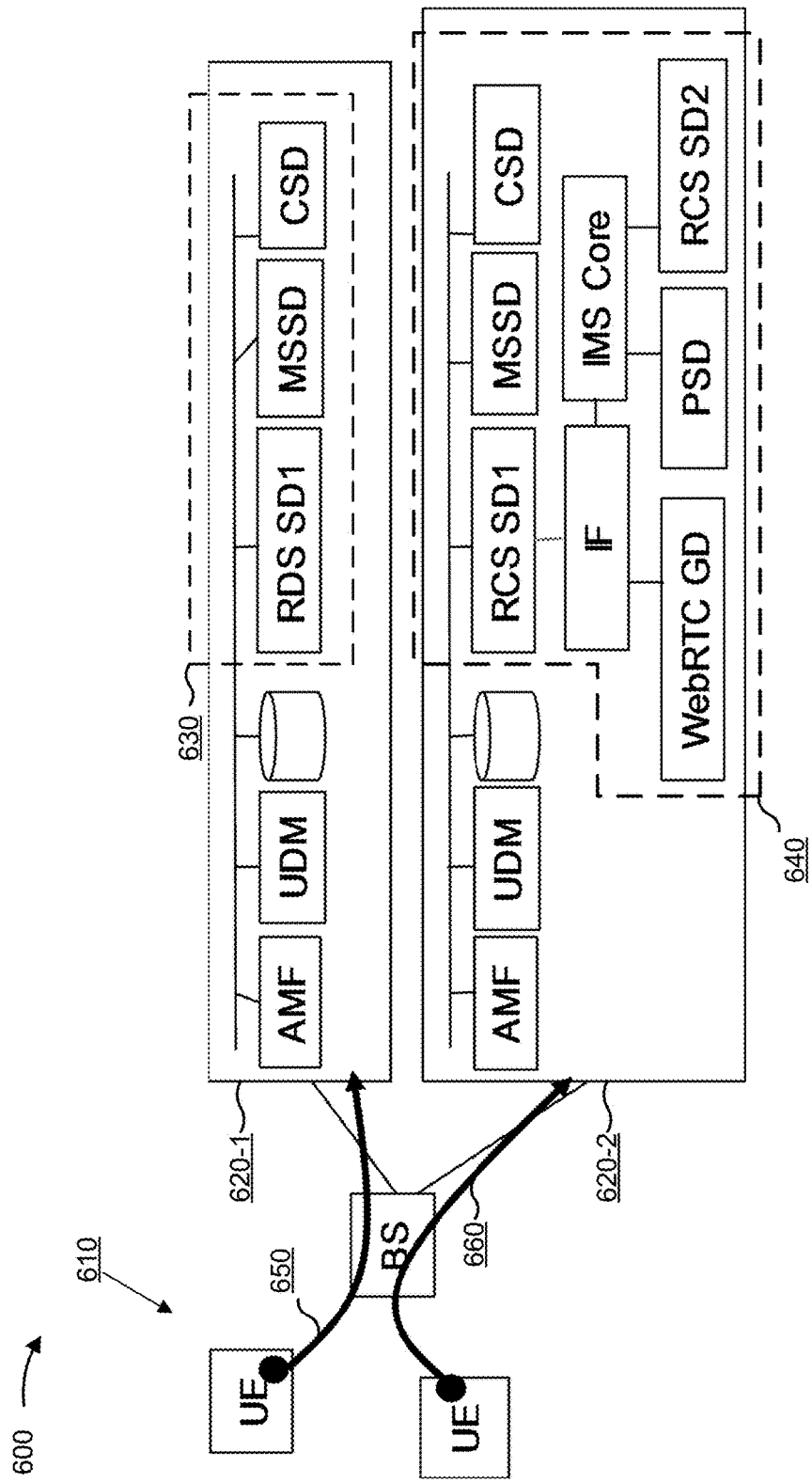
FIG. 6 is a diagram of an example implementation related to network slicing.

FIG. 6 is a diagram of an example implementation 600 related to network slicing. As shown, by reference number 610, implementation 600 includes multiple UEs connected to a base station (BS). As further shown the BS can be hosting a network slice 620-1 and a network slice 620-2. As shown by reference number 630, network slice 620-1 can include a set of elements related to providing non-IMS RCS messaging. For example, the set of components can permit non-IMS RCS messaging between non-IMS RCS messaging-capable devices. While network slice 620-1 does not include elements that can be used to facilitate communication between non-IMS RCS messaging capable devices and IMS-based messaging capable devices, deploying a network slice in this manner is more efficient when the UEs that are communicating are capable of communicating utilizing non-IMS RCS messaging.

As shown by reference number 640, network slice 620-2 can include another set of elements related to providing RCS messaging. For example, the other set of components can permit selective providing of RCS messages utilizing non-IMS RCS messaging and/or IMS-based RCS messaging, in a manner similar to that described elsewhere herein (e.g., based on including an IF, an IMS core, a webRTC GD, a PSD, and/or two RCS SDs). Deploying a network slice in this manner facilitates interoperability between UEs that have different RCS messaging capabilities. As shown by reference number 650, a first UE can connect to network slice 620-1 via the base station to utilize the elements of network slice 620-1. As shown by reference number 660, a second UE can connect to network slice 620-2 via the B S to utilize the elements of network slice 620-2.

As indicated above, FIG. 6 is provided merely as an example. Other examples are possible and can differ from what was described with regard to FIG. 6.

Figure 7:
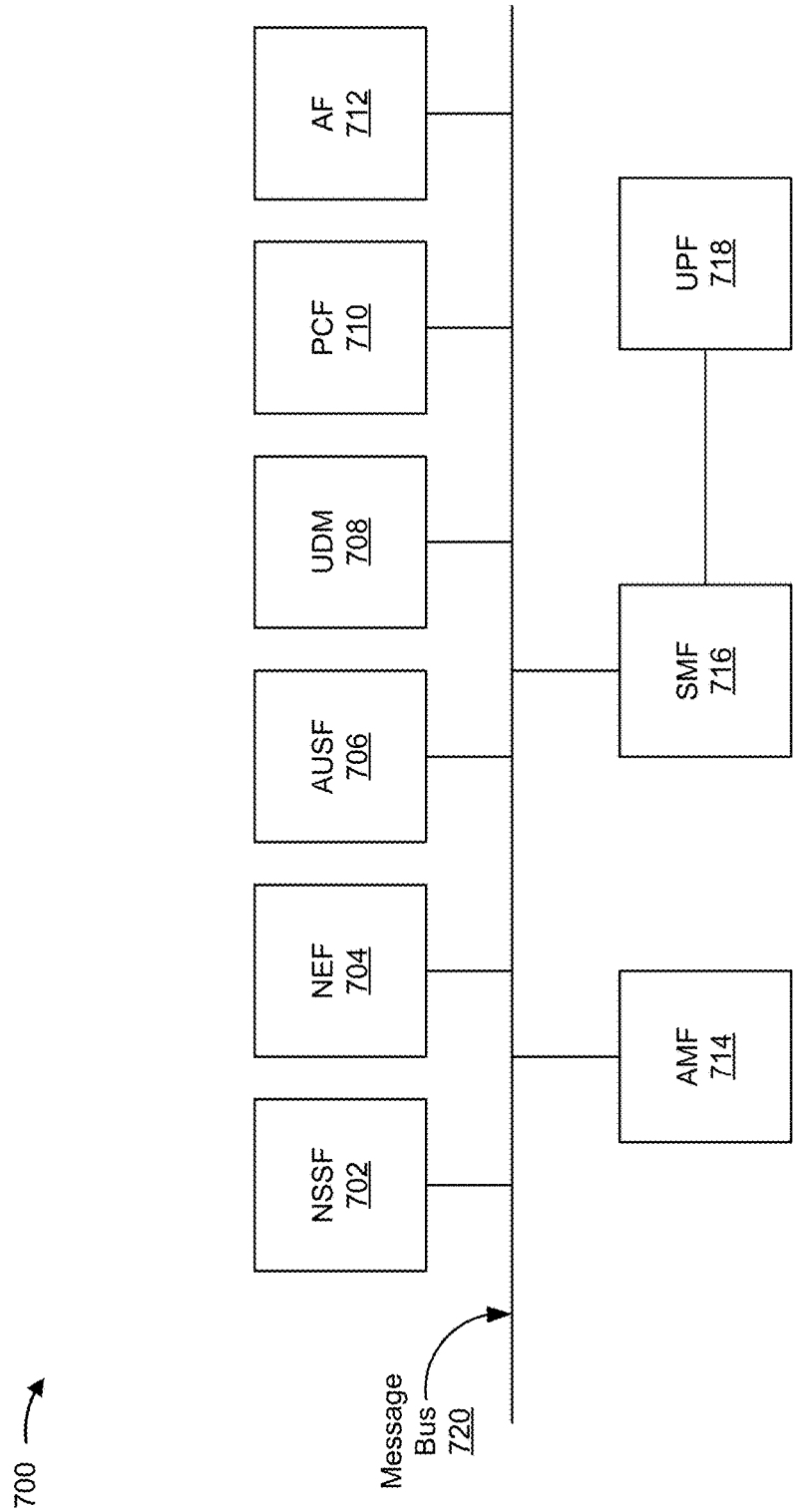
FIG. 7 is a diagram of an example functional architecture of an example core network described herein.

FIG. 7 is a diagram of an example functional architecture of a core network 700 in which systems and/or methods, described herein, can be implemented. For example, FIG. 7 can show an example architecture of a 5G NG core network included in a 5G wireless telecommunications system. In some implementations, the example architecture can be implemented by a core network (e.g., a core network described with respect to FIG. 8) and/or one or more of devices (e.g., a device described with respect to FIG. 9). While the example architecture of core network 700 shown in FIG. 7 can be an example of a service-based architecture, in some implementations, core network 700 can be implemented as a reference-point architecture.

As shown in FIG. 7, core network 700 can include a number of functional elements. The functional elements can include, for example, an NSSF 702, an NEF 704, an AUSF 706, a UDM component 708, a PCF 710, an Application Function (AF) 712, an AMF 714, an SMF 716, a UPF 718, and/or the like. These functional elements can be communicatively connected via a message bus 720. Each of the functional elements shown in FIG. 7 is implemented on one or more devices associated with a wireless telecommunications system. In some implementations, one or more of the functional elements can be implemented on physical devices, such as an access point, a base station, a gateway, and/or the like. In some implementations, one or more of the functional elements can be implemented on a computing device of a cloud computing environment.

NSSF 702 is a hardware-based element that can select network slice instances for UE's. By providing network slicing, NSSF 702 allows an operator to deploy multiple substantially independent end-to-end networks potentially with the same infrastructure. In some implementations, each slice can be customized for different services. NEF 704 is a hardware-based element that can support the exposure of capabilities and/or events in the wireless telecommunications system to help other entities in the wireless telecommunications system discover network services.

AUSF 706 is a hardware-based element that can act as an authentication server and support the process of authenticating UEs in the wireless telecommunications system. UDM component 708 is a hardware-based element that can store subscriber data and profiles in the wireless telecommunications system. UDM component 708 can be used for fixed access, mobile access, and/or the like, in core network 700. PCF 710 is a hardware-based element that can provide a policy framework that incorporates network slicing, roaming, packet processing, mobility management, and/or the like.

AF 712 is a hardware-based element that can support application influence on traffic routing, access to NEF 704, policy control, and/or the like. AMF 714 is a hardware-based element that can act as a termination point for Non Access Stratum (NAS) signaling, mobility management, and/or the like. SMF 716 is a hardware-based element that can support the establishment, modification, and release of communications sessions in the wireless telecommunications system. For example, SMF 716 can configure traffic steering policies at UPF 718, enforce UE IP address allocation and policies, and/or the like.

UPF 718 is a hardware-based element that can serve as an anchor point for intra/inter-Radio Access Technology (RAT) mobility. UPF 718 can apply rules to packets, such as rules pertaining to packet routing, traffic reporting, handling user plane QoS, and/or the like. Message bus 720 represents a communication structure for communication among the functional elements. In other words, message bus 720 can permit communication between two or more functional elements.

The number and arrangement of functional elements shown in FIG. 7 are provided as an example. In practice, there can be additional functional elements, fewer functional elements, different functional elements, or differently arranged functional elements than those shown in FIG. 7. Furthermore, two or more functional elements shown in FIG. 7 can be implemented within a single device, or a single functional element shown in FIG. 7 can be implemented as multiple, distributed devices. Additionally, or alternatively, a set of functional elements (e.g., one or more functional elements) of core network 700 can perform one or more functions described as being performed by another set of functional elements of core network 700.

Figure 8:
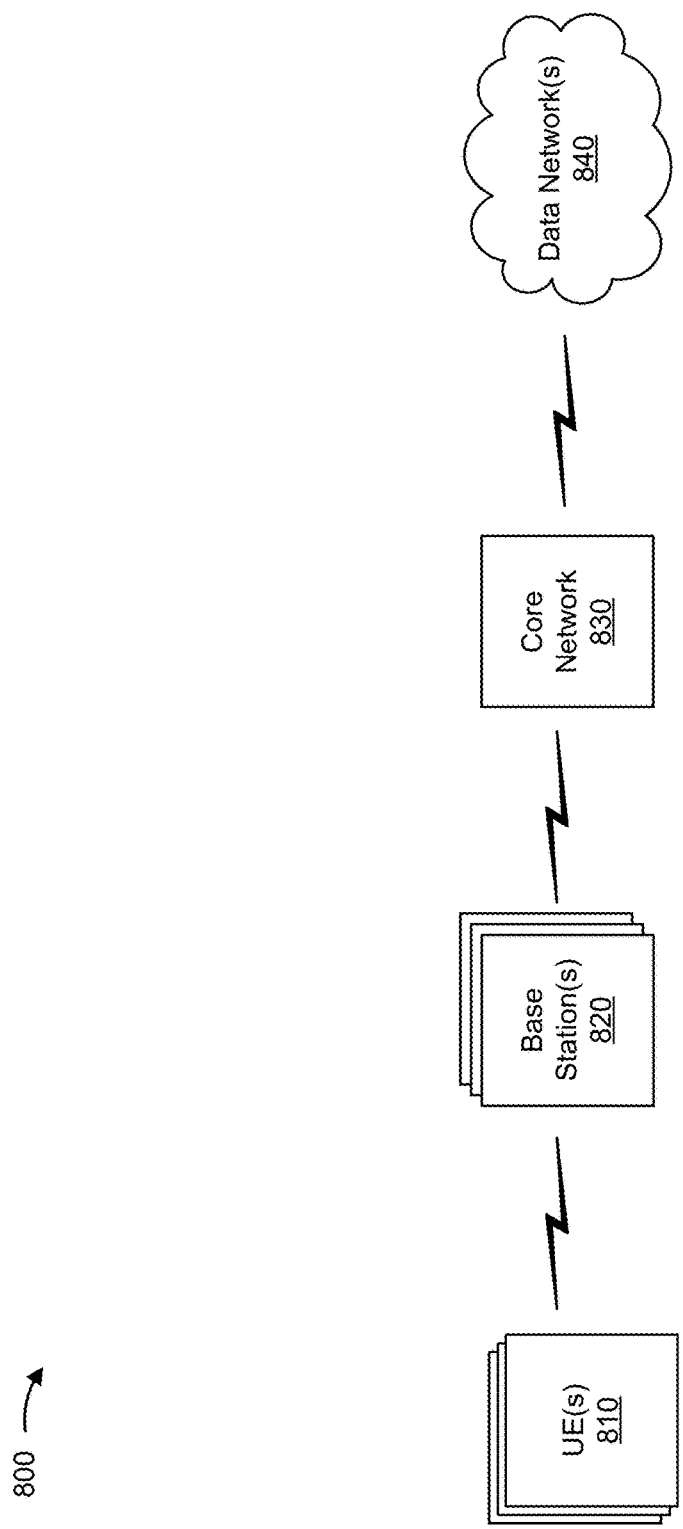
FIG. 8 is a diagram of an example environment in which systems, functional architectures, and/or methods, described herein, can be implemented.

FIG. 8 is a diagram of an example environment 800 in which systems, functional elements, and/or methods, described herein, can be implemented. As shown in FIG. 8, environment 800 can include one or more UEs 810, one or more base stations 820, a core network 830, and one or more data networks 840. Devices of environment 800 can interconnect via wired connections, wireless connections, or a combination of wired and wireless connections.

UE 810 includes one or more devices capable of communicating with base station 820 and/or data network 840 (e.g., via core network 830). For example, UE 810 can include a wireless communications device, a radiotelephone, a personal communications system (PCS) terminal (e.g., that can combine a cellular radiotelephone with data processing and data communications capabilities), a smart phone, a laptop computer, a tablet computer, a personal gaming system, a mobile hotspot device, a fixed wireless access device, a customer premises equipment, and/or a similar device. UE 810 can be capable of communicating using uplink (e.g., UE 810 to base station 820) communications, downlink (e.g., base station 820 to UE 810) communications, and/or sidelink (e.g., UE-to-UE) communications. In some implementations, UE 810 can include a machine-type communication (MTC) UE, such as an evolved or enhanced MTC (eMTC) UE. In some implementations, UE 810 can include an Internet of Things (IoT) UE, such as a narrowband IoT (NB-IoT) UE and/or the like. In some implementations, UE 810 can be capable of communicating using multiple RATs.

Base station 820 includes one or more devices capable of communicating with UE 810 using a cellular RAT. For example, base station 820 can include a base transceiver station, a radio base station, a node B, an eNB, a gNB, a base station subsystem, a cellular site, a cellular tower (e.g., a cell phone tower, a mobile phone tower, and/or the like), an access point, a transmit receive point (TRP), a radio access node, a macrocell base station, a microcell base station, a picocell base station, a femtocell base station, or a similar type of device. Base station 820 can transfer traffic between UE 810 (e.g., using a cellular RAT), other base stations 820 (e.g., using a wireless interface or a backhaul interface, such as a wired backhaul interface), and/or core network 830. Base station 820 can provide one or more cells that cover geographic areas. Some base stations 820 can be mobile base stations. Some base stations 820 can be capable of communicating using multiple RATs.

In some implementations, base station 820 can perform scheduling and/or resource management for UEs 810 covered by base station 820 (e.g., UEs 810 covered by a cell provided by base station 820). In some implementations, base station 820 can be controlled or coordinated by a network controller, which can perform load balancing, network-level configuration, and/or the like. The network controller can communicate with base stations 820 via a wireless or wireline backhaul. In some implementations, base station 820 can include a network controller, a self-organizing network (SON) module or component, or a similar module or component. In other words, a base station 820 can perform network control, scheduling, and/or network management functions (e.g., for other base stations 820 and/or for uplink, downlink, and/or sidelink communications of UEs 810 covered by the base station 820). In some implementations, base station 820 can include a central unit and multiple distributed units. The central unit can coordinate access control and communication with regard to the multiple distributed units. The multiple distributed units can provide UEs 810 and/or other base stations 820 with access to data network 840 via core network 830.

Core network 830 includes various types of core network architectures, such as a 5G NG Core (e.g., core network 700 of FIG. 7), a long-term evolution (LTE) evolved packet core (EPC), and/or the like. In some implementations, core network 830 can be implemented on physical devices, such as a gateway, a mobility management entity, and/or the like. In some implementations, the hardware and/or software implementing core network 830 can be virtualized (e.g., through the use of network function virtualization and/or software-defined networking), thereby allowing for the use of composable infrastructure when implementing core network 830. In this way, networking, storage, and compute resources can be allocated to implement the functions of core network 830 (described in FIG. 7) in a flexible manner as opposed to relying on dedicated hardware and software to implement these functions.

Data network 840 includes one or more wired and/or wireless data networks. For example, data network 840 can include an IMS, a public land mobile network (PLMN), a local area network (LAN), a wide area network (WAN), a metropolitan area network (MAN), a private network such as a corporate intranet, an ad hoc network, the Internet, a fiber optic-based network, a cloud computing network, a third party services network, an operator services network, and/or the like, and/or a combination of these or other types of networks.

The number and arrangement of devices and networks shown in FIG. 8 are provided as an example. In practice, there can be additional devices and/or networks, fewer devices and/or networks, different devices and/or networks, or differently arranged devices and/or networks than those shown in FIG. 8. Furthermore, two or more devices shown in FIG. 8 can be implemented within a single device, or a single device shown in FIG. 8 can be implemented as multiple, distributed devices. Additionally, or alternatively, a set of devices (e.g., one or more devices) of environment 800 can perform one or more functions described as being performed by another set of devices of environment 800.

Figure 9:
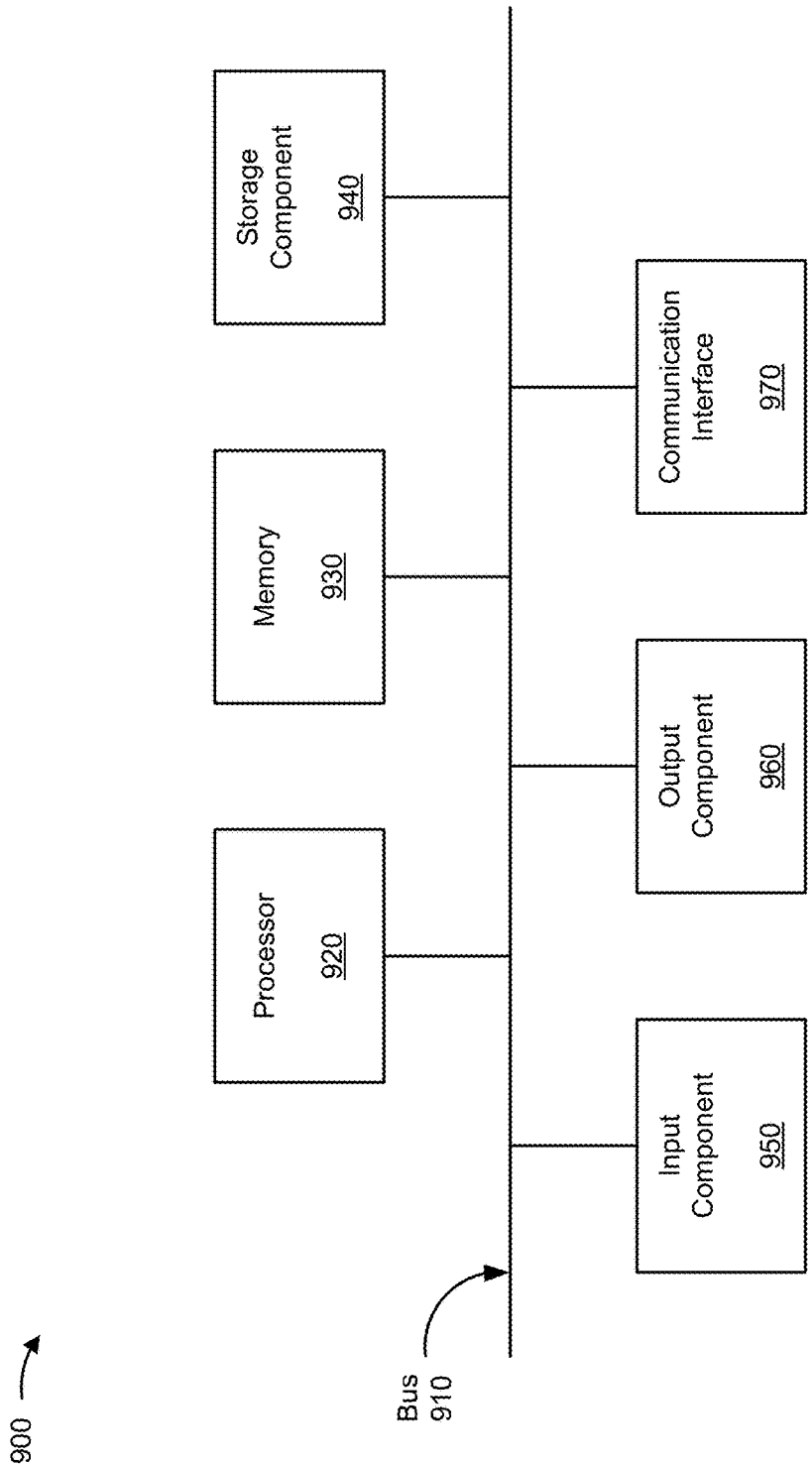
FIG. 9 is a diagram of example components of one or more devices of FIGS. 7 and 8.

FIG. 9 is a diagram of example components of a device 900. Device 900 can correspond to, or can implement, one or more functional elements of core network 700, UE 810, base station 820, one or more functional elements or devices of core network 830, and/or data network 840. In some implementations, one or more functional elements of core network 700, UE 810, base station 820, one or more functional elements or devices of core network 830, and/or data network 840 can include one or more devices 900 and/or one or more components of device 900. As shown in FIG. 9, device 900 can include a bus 910, a processor 920, a memory 930, a storage component 940, an input component 950, an output component 960, and a communication interface 970.

Bus 910 includes a component that permits communication among the components of device 900. Processor 920 is implemented in hardware, firmware, or a combination of hardware and software. Processor 920 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 920 includes one or more processors capable of being programmed to perform a function. Memory 930 includes a random access memory (RAM), a read only memory (ROM), and/or another type of dynamic or static storage device (e.g., a flash memory, a magnetic memory, and/or an optical memory) that stores information and/or instructions for use by processor 920.

Storage component 940 stores information and/or software related to the operation and use of device 900. For example, storage component 940 can include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 950 includes a component that permits device 900 to receive information, such as via user input (e.g., a touch screen display, a keyboard, a keypad, a mouse, a button, a switch, and/or a microphone). Additionally, or alternatively, input component 950 can include a sensor for sensing information (e.g., a global positioning system (GPS) component, an accelerometer, a gyroscope, and/or an actuator). Output component 960 includes a component that provides output information from device 900 (e.g., a display, a speaker, and/or one or more light-emitting diodes (LEDs)).

Communication interface 970 includes a transceiver-like component (e.g., a transceiver and/or a separate receiver and transmitter) that enables device 900 to communicate with other devices, such as via a wired connection, a wireless connection, or a combination of wired and wireless connections. Communication interface 970 can permit device 900 to receive information from another device and/or provide information to another device. For example, communication interface 970 can include an Ethernet interface, an optical interface, a coaxial interface, an infrared interface, a radio frequency (RF) interface, a universal serial bus (USB) interface, a wireless local area network interface, a cellular network interface, and/or the like.

Device 900 can perform one or more processes described herein. Device 900 can perform these processes based on processor 920 executing software instructions stored by a non-transitory computer-readable medium, such as memory 930 and/or storage component 940. A computer-readable medium is defined herein as a non-transitory memory device. A memory device includes memory space within a single physical storage device or memory space spread across multiple physical storage devices.

Software instructions can be read into memory 930 and/or storage component 940 from another computer-readable medium or from another device via communication interface 970. When executed, software instructions stored in memory 930 and/or storage component 940 can cause processor 920 to perform one or more processes described herein. Additionally, or alternatively, hardwired circuitry can be used in place of or in combination with software instructions to perform one or more processes described herein. Thus, implementations described herein are not limited to any specific combination of hardware circuitry and software.

The number and arrangement of components shown in FIG. 9 are provided as an example. In practice, device 900 can include additional components, fewer components, different components, or differently arranged components than those shown in FIG. 9. Additionally, or alternatively, a set of components (e.g., one or more components) of device 900 can perform one or more functions described as being performed by another set of components of device 900.

Figure 10:
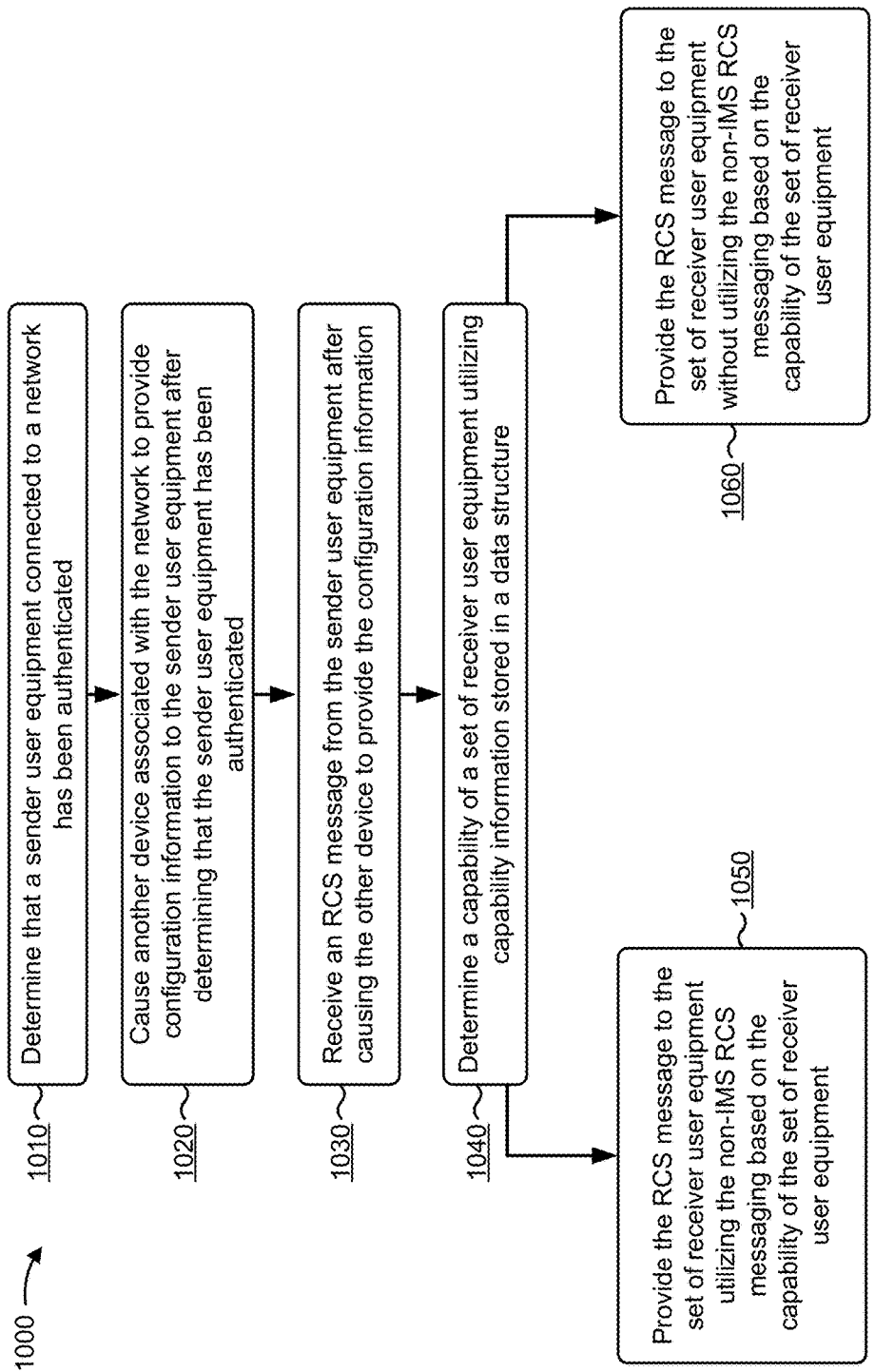
FIG. 10 is a flow chart of an example process for integrated rich communications services (RCS) messaging.

FIG. 10 is a flow chart of an example process 1000 for integrated RCS messaging. In some implementations, one or more process blocks of FIG. 10 can be performed by an RCS SD, which can be included in a core network (e.g., core network 700, core network 830, and/or the like). In some implementations, one or more process blocks of FIG. 10 can be performed by another device or a group of devices separate from or including the RCS SD, such as other components in core network 830, UE(s) 810, base station(s) 820, data network 840, and/or the like.

As shown in FIG. 10, process 1000 can include determining that a sender user equipment connected to a network has been authenticated (block 1010). For example, the RCS SD can determine that a sender user equipment connected to a network has been authenticated, in a manner that is the same as or similar to that described with regard to FIG. 1.

As further shown in FIG. 10, process 1000 can include causing another device associated with the network to provide configuration information to the sender user equipment after determining that the sender user equipment has been authenticated (block 1020). For example, the RCS SD can cause another device associated with the network to provide configuration information to the sender user equipment after determining that the sender user equipment has been authenticated, in a manner that is the same as or similar to that described with regard to FIG. 1.

As further shown in FIG. 10, process 1000 can include receiving an RCS message from the sender user equipment after causing the other device to provide the configuration information (block 1030). For example, the RCS SD can receive an RCS message from the sender user equipment after causing the other device to provide the configuration information, in a manner that is the same as or similar to that described with regard to FIG. 1.

As further shown in FIG. 10, process 1000 can include determining a capability of a set of receiver user equipment utilizing capability information stored in a data structure (block 1040). For example, the RCS SD can determine a capability of a set of receiver user equipment utilizing capability information stored in a data structure, in a manner that is the same as or similar to that described with regard to FIG. 1.

As further shown in FIG. 10, process 1000 can include selectively providing the RCS message to the set of receiver user equipment utilizing the non-IMS RCS messaging based on the capability of the set of receiver user equipment (block 1050), or providing the RCS message to the set of receiver user equipment without utilizing the non-IMS RCS messaging based on the capability of the set of receiver user equipment (block 1060). For example, the RCS SD can selectively provide the RCS message to the set of receiver user equipment utilizing the non-IMS RCS messaging based on the capability of the set of receiver user equipment, or can provide the RCS message to the set of receiver user equipment without utilizing the non-IMS RCS messaging based on the capability of the set of receiver user equipment, in a manner that is the same as or similar to that described with regard to FIG. 1.

Process 1000 can include additional implementations, such as any single implementation or any combination of implementations described below and/or in connection with one or more other methods described elsewhere herein.

In some implementations, the sender user equipment can be configured to communicate utilizing rich communications services (RCS) messaging. In some implementations, the configuration information can identify one or more configurations of the network related to the RCS messaging. In some implementations, the RCS message can be destined for a set of receiver user equipment. In some implementations, the set of receiver user equipment can be capable of communicating utilizing non-IMS RCS messaging. In some implementations, the set of receiver user equipment can be not capable of communicating utilizing the non-IMS RCS messaging. In some implementations, the configuration information can be in a form of an extensible markup language (XML) file.

In some implementations, the RCS SD can provide the RCS message to the set of receiver user equipment via an IMS core based on the set of receiver user equipment not being capable of communicating utilizing the non-IMS RCS messaging. In some implementations, the RCS SD can provide the RCS message to the set of receiver user equipment without providing the RCS message via an IMS core based on the set of receiver user equipment being capable of communicating utilizing the non-IMS RCS messaging. In some implementations, the RCS SD can convert the RCS message into another format prior to providing the RCS message to the set of receiver user equipment based on the set of receiver user equipment not being capable of communicating utilizing the non-IMS RCS messaging (e.g., where the other format includes a session initiation protocol (SIP) format).

In some implementations, the RCS SD can determine that the capability information indicates that the set of receiver user equipment is capable of communicating utilizing the non-IMS RCS messaging prior to providing the RCS message to the set of receiver user equipment. In some implementations, the RCS SD can determine that the capability information indicates that the set of receiver user equipment is not capable of communicating utilizing the non-IMS RCS messaging prior to providing the RCS message to the set of receiver user equipment.

Although FIG. 10 shows example blocks of process 1000, in some implementations, process 1000 can include additional blocks, fewer blocks, different blocks, or differently arranged blocks than those depicted in FIG. 10. Additionally, or alternatively, two or more of the blocks of process 1000 can be performed in parallel.

In this way, the RCS SD facilitates interoperability between IMS-based RCS messaging and non-IMS RCS messaging. This facilitates implementation of RCS messaging in a 5 g/NR architecture, thereby improving RCS messaging. In addition, this reduces or eliminates a need for use of an IMS core for RCS messaging, thereby conserving processing resources that would otherwise be consumed utilizing the IMS core. Further, this reduces or eliminates latency associated with utilizing an IMS core for RCS messaging.

Although some implementations are described in the context of RCS messaging, the implementations described herein apply equally to other RCS-based services.

The foregoing disclosure provides illustration and description, but is not intended to be exhaustive or to limit the implementations to the precise form disclosed. Modifications and variations are possible in light of the above disclosure or can be acquired from practice of the implementations.

As used herein, the term component is intended to be broadly construed as hardware, firmware, or a combination of hardware and software.

To the extent the aforementioned embodiments collect, store, or employ personal information provided by individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods, described herein, can be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features can be combined in ways not specifically recited in the claims and/or disclosed in the specification. Although each dependent claim listed below can directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and can be used interchangeably with "one or more." Furthermore, as used herein, the term "set" is intended to include one or more items (e.g., related items, unrelated items, a combination of related and unrelated items, etc.), and can be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
   determining, by a device, that a sender user equipment connected to a network has been authenticated,
      wherein the sender user equipment is configured to communicate utilizing rich communications services (RCS) messaging;
   causing, by the device, another device associated with the network to provide configuration information to the sender user equipment after determining that the sender user equipment has been authenticated, wherein the configuration information identifies one or more configurations of the network related to the RCS messaging;
receiving, by the device, an RCS message from the sender user equipment after causing the other device to provide the configuration information,
wherein the RCS message is destined for a set of receiver user equipment,
wherein a first receiver user equipment of the set of receiver user equipment is capable of communicating utilizing non-Internet protocol (IP) multimedia subsystem (IMS) RCS messaging, and
wherein a second receiver user equipment of the set of receiver user equipment is not capable of communicating utilizing the non-IMS RCS messaging;
determining, by the device, a capability of the set of receiver user equipment utilizing capability information stored in a data structure;
providing, by the device and via a first set of network elements hosted by the device, the RCS message to the first receiver user equipment, of the set of receiver user equipment, utilizing the non-IMS RCS messaging based on the capability of the first receiver user equipment; and
providing, by the device and via a second set of network elements hosted by the device, the RCS message to the second receiver user equipment, of the set of receiver user equipment, without utilizing the non-IMS RCS messaging based on the capability of the second receiver user equipment,
wherein the first set of network elements and the second set of network elements are different, and
wherein the first receiver user equipment and the second receiver user equipment are different.

2. The method of claim 1, wherein providing the RCS message to the second receiver user equipment comprises:
providing the RCS message to the second receiver user equipment via an IMS core based on the second receiver user equipment not being capable of communicating utilizing the non-IMS RCS messaging.

3. The method of claim 1, wherein providing the RCS message to the first receiver user equipment comprises:
providing the RCS message to the first receiver user equipment without providing the RCS message via an IMS core based on the first receiver user equipment being capable of communicating utilizing the non-IMS RCS messaging.

4. The method of claim 1, further comprising:
converting the RCS message into another format prior to providing the RCS message to the second receiver user equipment based on the second receiver user equipment not being capable of communicating utilizing the non-IMS RCS messaging,
wherein the other format includes a session initiation protocol (SIP) format.

5. The method of claim 1, wherein the configuration information is in a form of an extensible markup language (XML) file.

6. The method of claim 1, wherein determining the capability of the set of receiver user equipment comprises:
determining that the capability information indicates that the first receiver user equipment is capable of communicating utilizing the non-IMS RCS messaging prior to providing the RCS message to the first receiver user equipment.

7. The method of claim 1, wherein determining the capability of the set of receiver user equipment comprises:
determining that the capability information indicates that the second receiver user equipment is not capable of communicating utilizing the non-IMS RCS messaging prior to providing the RCS message to the second receiver user equipment.

8. A device, comprising:
one or more memories; and
one or more processors, communicatively coupled to the one or more memories, to:
determine that a sender user equipment connected to a network has been authenticated,
wherein the sender user equipment is configured to communicate utilizing rich communications services (RCS) messaging;
cause another device associated with the network to provide configuration information to the sender user equipment after determining that the sender user equipment has been authenticated,
wherein the configuration information identifies one or more configurations of the network related to the RCS messaging;
receive an RCS message from the sender user equipment after causing the other device to provide the configuration information,
wherein the RCS message is destined for a set of receiver user equipment,
wherein a first receiver user equipment of the set of receiver user equipment is capable of communicating utilizing non-Internet protocol (IP) multimedia subsystem (IMS) RCS messaging, and
wherein a second receiver user equipment of the set of receiver user equipment is not capable of communicating utilizing the non-IMS RCS messaging;
determine a capability of the set of receiver user equipment utilizing capability information stored in a data structure;
provide, via a first set of network elements hosted by the device, the RCS message to the first receiver user equipment, of the set of receiver user equipment utilizing the non-IMS RCS messaging based on the capability of the first receiver user equipment; and
provide, via a second set of network elements hosted by the device, the RCS message to the second receiver user equipment, of the set of receiver user equipment without utilizing the non-IMS RCS messaging based on the capability of the second receiver user equipment,
wherein the first set of network elements and the second set of network elements are different, and
wherein the first receiver user equipment and the second receiver user equipment are different.

9. The device of claim 8, wherein the one or more processors, when providing the RCS message to the second receiver user equipment, are to:
provide the RCS message to the second receiver user equipment via an IMS core based on the second receiver user equipment not being capable of communicating utilizing the non-IMS RCS messaging.

10. The device of claim 8, wherein the one or more processors, when providing the RCS message to the first receiver user equipment, are to:
provide the RCS message to the first receiver user equipment without providing the RCS message via an IMS core based on the first receiver user equipment being capable of communicating utilizing the non-IMS RCS messaging.

11. The device of claim 8, wherein the one or more processors are further to:
convert the RCS message into another format prior to providing the RCS message to the second receiver user equipment based on the second receiver user equipment not being capable of communicating utilizing the non-IMS RCS messaging,
wherein the other format includes a session initiation protocol (SIP) format.

12. The device of claim 8, wherein the configuration information is in a form of an extensible markup language (XML) file.

13. The device of claim 8, wherein the one or more processors, when determining the capability of the set of receiver user equipment, are to:
determine that the capability information indicates that the first receiver user equipment is capable of communicating utilizing the non-IMS RCS messaging prior to providing the RCS message to the first receiver user equipment.

14. The device of claim 8, wherein the one or more processors, when determining the capability of the set of receiver user equipment, are to:
determine that the capability information indicates that the second receiver user equipment is not capable of communicating utilizing the non-IMS RCS messaging prior to providing the RCS message to the second receiver user equipment.

15. A non-transitory computer-readable medium storing instructions, the instructions comprising:
one or more instructions that, when executed by one or more processors, cause the one or more processors to:
determine that a sender user equipment connected to a network has been authenticated,
wherein the sender user equipment is configured to communicate utilizing rich communications services (RCS) messaging;
cause another device associated with the network to provide configuration information to the sender user equipment after determining that the sender user equipment has been authenticated,
wherein the configuration information identifies one or more configurations of the network related to the RCS messaging;
receive an RCS message from the sender user equipment after causing the other device to provide the configuration information,
wherein the RCS message is destined for a set of receiver user equipment,
wherein a first receiver user equipment of the set of receiver user equipment is capable of communicating utilizing non-Internet protocol (IP) multimedia subsystem (IMS) RCS messaging, and
wherein a second receiver user equipment of the set of receiver user equipment is not capable of communicating utilizing the non-IMS RCS messaging;
determine a capability of the set of receiver user equipment utilizing capability information stored in a data structure;
provide, via a first set of network elements hosted by a device, the RCS message to the first receiver user equipment, of the set of receiver user equipment utilizing the non-IMS RCS messaging based on the capability of the first receiver user equipment; and
provide, via a second set of network elements hosted by the device, the RCS message to the second receiver user equipment, of the set of receiver user equipment without utilizing the non-IMS RCS messaging based on the capability of the second receiver user equipment,
wherein the first set of network elements and the second set of network elements are different, and
wherein the first receiver user equipment and the second receiver user equipment are different.

16. The non-transitory computer-readable medium of claim 15, wherein the one or more instructions, that cause the one or more processors to provide the RCS message to the second receiver user equipment, cause the one or more processors to:
provide the RCS message to the second receiver user equipment via an IMS core based on the second receiver user equipment not being capable of communicating utilizing the non-IMS RCS messaging.

17. The non-transitory computer-readable medium of claim 15, wherein the one or more instructions, that cause the one or more processors to provide the RCS message to the first receiver user equipment, cause the one or more processors to:
provide the RCS message to the first receiver user equipment without providing the RCS message via an IMS core based on the first receiver user equipment being capable of communicating utilizing the non-IMS RCS messaging.

18. The non-transitory computer-readable medium of claim 15, wherein the one or more instructions, when executed by the one or more processors, further cause the one or more processors to:
convert the RCS message into another format prior to providing the RCS message to the second receiver user equipment based on the second receiver user equipment not being capable of communicating utilizing the non-IMS RCS messaging,
wherein the other format includes a session initiation protocol (SIP) format.

19. The non-transitory computer-readable medium of claim 15, wherein the one or more instructions, that cause the one or more processors to determine the capability of the set of receiver user equipment, cause the one or more processors to:
determine that the capability information indicates that the first receiver user equipment is capable of communicating utilizing the non-IMS RCS messaging prior to providing the RCS message to the first receiver user equipment.

20. The non-transitory computer-readable medium of claim 15, wherein the one or more instructions, that cause the one or more processors to determine the capability of the set of receiver user equipment, cause the one or more processors to:
determine that the capability information indicates that the second receiver user equipment is not capable of communicating utilizing the non-IMS RCS messaging prior to providing the RCS message to the second receiver user equipment.

* * * * *